United States Patent
Lee et al.

(10) Patent No.: US 8,239,467 B2
(45) Date of Patent: Aug. 7, 2012

(54) EXTENDING BUSINESS PROCESSES TO MOBILE DEVICES

(75) Inventors: Andrew Lee, Markham (CA); Eric Nelson, Boise, ID (US)

(73) Assignee: iAnywhere Solutions, Inc., Dublin, CA (US)

( * ) Notice: Subject to any disclaimer, the term of this patent is extended or adjusted under 35 U.S.C. 154(b) by 302 days.

(21) Appl. No.: 12/543,727

(22) Filed: Aug. 19, 2009

(65) Prior Publication Data

US 2011/0047220 A1    Feb. 24, 2011

(51) Int. Cl.
    G06F 15/16    (2006.01)
(52) U.S. Cl. .................. 709/206; 709/203; 370/350
(58) Field of Classification Search .................. 709/204, 709/206; 715/841
    See application file for complete search history.

(56) References Cited

U.S. PATENT DOCUMENTS

| | | | |
|---|---|---|---|
| 6,560,604 B1 * | 5/2003 | Fascenda | 1/1 |
| 8,023,934 B2 * | 9/2011 | Jeide et al. | 455/418 |
| 2003/0041110 A1 * | 2/2003 | Wenocur et al. | 709/206 |
| 2006/0004703 A1 * | 1/2006 | Spivack et al. | 707/2 |
| 2006/0271708 A1 * | 11/2006 | Bolles et al. | 709/246 |
| 2006/0277205 A1 * | 12/2006 | Song et al. | 707/102 |
| 2007/0086587 A1 * | 4/2007 | Farahat et al. | 380/28 |
| 2007/0101297 A1 * | 5/2007 | Forstall et al. | 715/841 |
| 2007/0266093 A1 * | 11/2007 | Forstall et al. | 709/204 |
| 2008/0141141 A1 * | 6/2008 | Moore et al. | 715/748 |
| 2008/0168391 A1 * | 7/2008 | Robbin et al. | 715/810 |
| 2009/0107320 A1 * | 4/2009 | Willacy et al. | 84/609 |
| 2009/0249231 A1 * | 10/2009 | Mohr | 715/763 |
| 2010/0076989 A1 * | 3/2010 | Jakobson | 707/758 |
| 2010/0146132 A1 * | 6/2010 | Morris | 709/229 |
| 2010/0281117 A1 * | 11/2010 | Inkeroinen et al. | 709/206 |

* cited by examiner

*Primary Examiner* — Wing Chan
*Assistant Examiner* — Tesfay Yohannes
(74) *Attorney, Agent, or Firm* — Sterne, Kessler, Goldstein & Fox PLLC

(57) ABSTRACT

A system, method, and computer program product are provided for intercepting an e-mail from a backend system and converting the e-mail into a message which can be used by a mobile device to graphically represent a business process. The mobile device can interact with the graphic representation, or invoke a business method from a local graphic representation, in order to send a response message to the backend system for further communications.

18 Claims, 8 Drawing Sheets

EXTENDING BUSINESS PROCESSES TO MOBILE DEVICES

BACKGROUND OF INVENTION

1. Field of the Invention

The present invention relates generally to business processes and, more specifically, to integrating business processes into a mobile platform.

2. Description of the Background Art

Backend systems have been developed to automate many business processes within the workplace. A simple business process involving the creation of a work order by an employee and the approval or denial thereof by an employer is frequently automated by systems which allow the employee to create an electronic work order for the employer's review.

In many cases, these systems provide helpful e-mails to indicate a status change within the system. For example, when an employee creates a work order, the system may dispatch an e-mail to the employer indicating that a new work order is available in the system. The e-mail may even include some details of the work order, but does not provide any uniform manner in which the employer can readily approve or decline the work order within the e-mail itself. Instead, the employer must log on to the system and use the appropriate interface to approve or decline the work order.

Requiring direct access to the business process system creates several drawbacks. Notable among these drawbacks is the difficulty of accessing the business process system directly from a mobile device. Costly solutions require the development of dedicated client software on the mobile device to interface the business process system directly. Otherwise, a mobile device-equipped employee may have no recourse other than to return to the office in order to directly access the business process system.

The inability to use mobile devices effectively to automate interaction with business process systems is inefficient. Accordingly, what is desired is a means to interface with a backend system from a mobile device in an efficient and economical manner.

SUMMARY OF INVENTION

Embodiments of the invention include a method comprising intercepting an e-mail from a backend system, determining that the e-mail is a widget e-mail, transforming the widget e-mail into a widget message, and synchronizing the widget message to a client device.

Embodiments of the invention additionally include a computer-readable medium having computer-executable instructions stored thereon that, if executed by a computing device, cause the computing device to perform a method comprising intercepting an e-mail from a backend system, determining that the e-mail is a widget e-mail, transforming the widget e-mail into a widget message, and synchronizing the widget message to a client device.

Embodiments of the invention additionally include a system, comprising an interceptor configured to intercept an e-mail from a backend system and determine that the e-mail is a widget e-mail, a transformer configured to transform the widget e-mail into a widget message, and a sync engine configured to send the widget message to a mobile device.

Embodiments of the invention additionally include a method comprising receiving a client widget request from a client device, creating a function call to a backend system responsive to the client widget request, and transmitting the function call to the backend system.

Embodiments of the invention additionally include a computer-readable medium having computer-executable instructions stored thereon that, if executed by a computing device, cause the computing device to perform a method comprising receiving a client widget request from a client device, creating a function call to a backend system responsive to the client widget request, and transmitting the function call to the backend system.

Embodiments of the invention additionally include a method comprising receiving a widget message, running a user interface, populating the user interface with contents of the widget message, receiving an input from the user interface, and sending a widget request based on the input.

Embodiments of the invention additionally include a system comprising a mobile office client in communication with a mobile office server, and a client widget configured to receive a widget message, run a user interface, and populate the user interface with contents of the widget message.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form a part of the specification, illustrate embodiments of the present invention and, together with the description, further serve to explain the principles of the invention and to enable a person skilled in the relevant art to make and use the invention.

Figure 1:
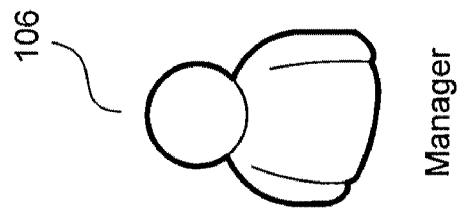
FIG. 1 is an example of a business process in which the actors are a field employee and a manager, in accordance with an embodiment of the present invention.
Figure 1:
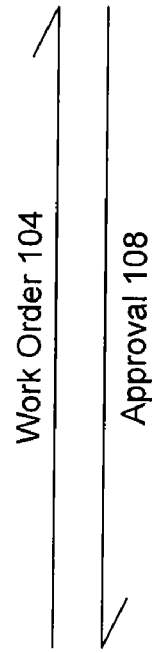
Figure 1:
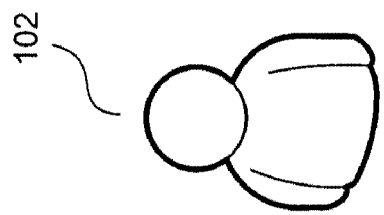

The present invention will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

I. Introduction

The following detailed description of the present invention refers to the accompanying drawings that illustrate exemplary embodiments consistent with this invention. Other embodiments are possible, and modifications can be made to the embodiments within the spirit and scope of the invention. Therefore, the detailed description is not meant to limit the invention. Rather, the scope of the invention is defined by the appended claims.

It would be apparent to one of skill in the art that the present invention, as described below, can be implemented in many different embodiments of software, hardware, firmware, and/or the entities illustrated in the figures. Any actual software code with the specialized control of hardware to implement the present invention is not limiting of the present invention. Thus, the operational behavior of the present invention will be described with the understanding that modifications and variations of the embodiments are possible, given the level of detail presented herein.

FIG. 1 is an example of a business process 100 in which the actors are a field employee 102 and a manager 106, in accordance with an embodiment of the present invention. In this particular business process, the field employee 102 has just learned of the need for a repair. However, the business process 100 dictates that the field employee 102 must seek the approval of the manager 106 before performing the repair. Accordingly, field employee 102 submits a work order 104. This work order 104 is received by the manager 106, who reviews the contents thereof. If everything is satisfactory, the manager 106 sends an approval 108 of the work order 104 to field employee 102, authorizing the field employee 102 to proceed with the repair work.

One skilled in the relevant arts will appreciate that this particular business process 100 is provided by way of example, and not limitation, and other business processes involving other levels of interaction between one or more actors would work within the framework discussed herein.

Traditionally, the work order 104 and approval 108 are paper forms, which require the field employee 102 to fill out the form and submit it to the manager 106 for a signature, which in turn acts as the approval 108. Such a set up is disadvantageous, as a field employee 102 performing work at, by way of example, and not limitation, a client site, would have to return to the office to submit a paper work order 104.

More recently, electronic systems have been put in place which eliminate the paper component of the above example, but otherwise function in a similar manner. Field employee 102 can pull up an interface for a backend system developed to support business process 100. Using this interface, field employee 102 can submit the required information to complete work order 104, which is then sent to manager 106.

In these electronic systems, manager 106 is usually required to log on to the same backend system in order to retrieve and review the work order 104. Manager 106 may be notified that the work order 106 is ready for review by, for example, an e-mail indicating a submission to the backend system has been made. Upon logging in to the system in a managerial capacity, manager 106 reviews the work order 104 and electronically signs the work order, thereby creating an approval 108 notification.

Similarly, when the approval 108 is completed, field employee 102 is able to log on to the same backend system in order to retrieve and review the approval 108. Field employee 102 may also be notified that approval 108 has been received by, for example, an e-mail indicating the approval.

Despite the increased usefulness of these electronic systems over traditional paper filings, it has been difficult to implement access to the backend system within mobile devices. Without a mobile device interface, field employee 102 must still return to the office to access the backend system and create the work order 104. However, creating an interface to the backend system has traditionally involved writing dedicated software for a mobile device platform, or even building a custom mobile device platform for the task. Tying the business process to deployed mobile platforms increases the ease with which the business process can be implemented and itself deployed, as well as reducing expenses, among other benefits.

II. Business Process Widgets

Figure 2:
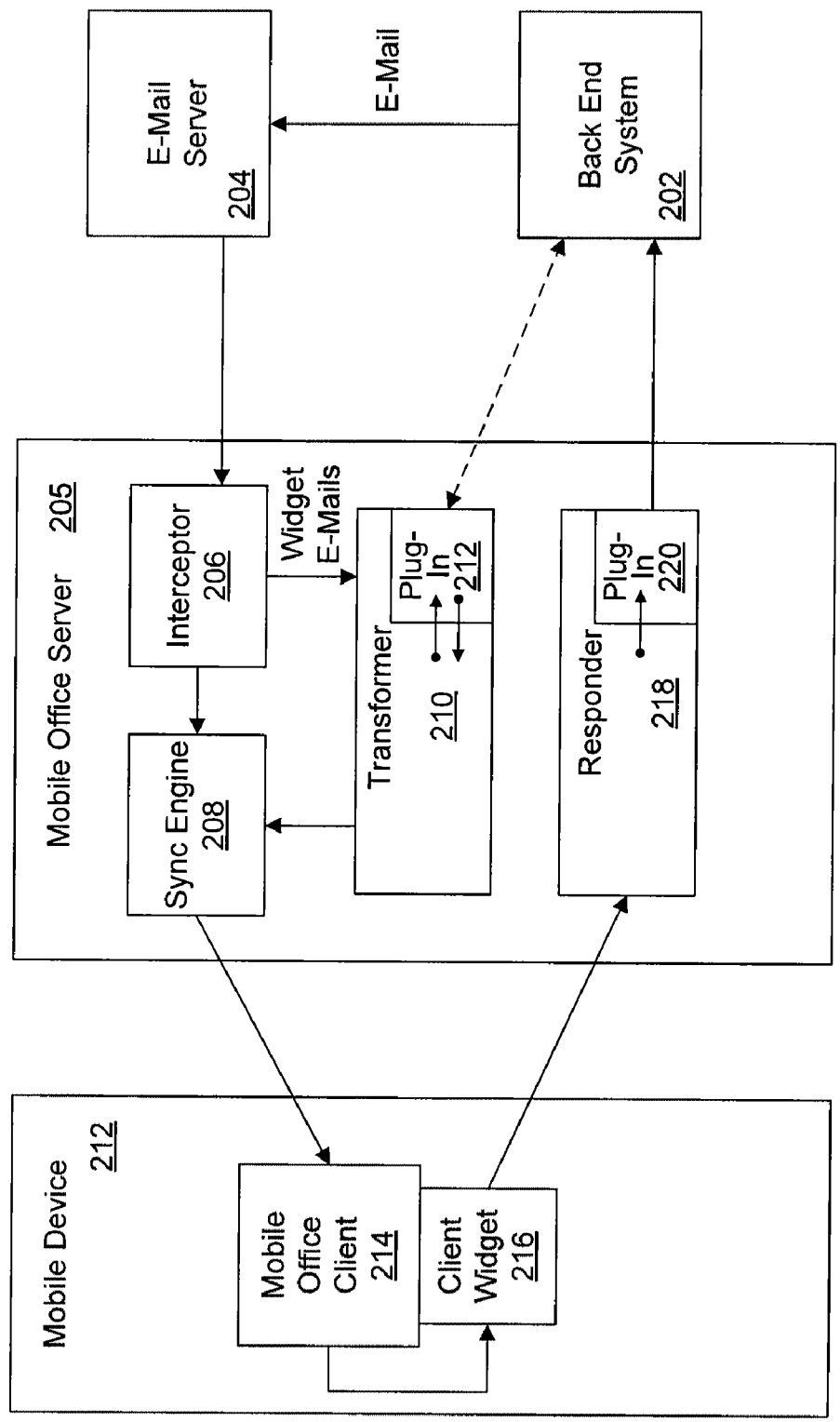
FIG. 2 is a network for managing a business process, in accordance with an embodiment of the present invention.

FIG. 2 is a network 200 for managing a business process, in accordance with an embodiment of the present invention. A backend system 202 natively handles the business process, in accordance with an embodiment of the present invention. In accordance with a further embodiment of the present invention, backend system 202 is a self-contained business process system able to handle every phase of the business process, such as business process 100, entirely within the backend system 202. One skilled in the relevant arts will appreciate that although backend system 202 is shown as a single component, it may comprise multiple servers or devices, arranged locally or globally, and communicating over a local access network or a wide access network, such as the Internet. One skilled in the relevant arts will recognize that additional embodiments of the backend system 202 will conform to the network 200 of FIG. 2.

By way of example, and not limitation, backend system 202 manages a business process comprising employee vacation time verification, although one skilled in the relevant arts will recognize that other example business processes could be handled by backend system 202. An employee wishing to request vacation time would normally be able to log in to backend system 202 and enter the vacation time request, in accordance with an embodiment of the present invention. Vacation approvers (e.g., a manager) can log in to the backend system 202 and approve or decline a vacation request.

Whenever a business process is initiated within backend system 202, the backend system 202 sends an e-mail, as shown in FIG. 2, to e-mail server 204, in accordance with an embodiment of the present invention. The intended destination of this e-mail varies with the particular business process, but is usually the e-mail account associated with a user who needs to take the next action in the business process. Continuing the above example, and not by way of limitation, when an employee requests vacation time within backend system 202, an e-mail is dispatched to the employee's manager via e-mail server 204 in order to notify the manager of the pending request.

In accordance with a further embodiment of the present invention, the e-mail at e-mail server 204 is forwarded to mobile office server 205 for distribution to a mobile device 212. In an example embodiment, mobile office server 205 is the iAnywhere Mobile Office server platform by Sybase, Inc., although one skilled in the relevant arts will appreciate that the concepts described herein can be applied to other enterprise services.

The e-mail intended for mobile device 212 is intercepted at mobile office server 205 by interceptor 206, in accordance with an embodiment of the present invention. In the event that the e-mail is a regular e-mail (i.e., an e-mail not originating from backend system 202, or otherwise not involved with the processes described herein), then the e-mail is passed on to sync engine 208, in accordance with a further embodiment of the present invention. Sync engine 208 is configured to transmit this e-mail to mobile device 212. Any existing method can be used for such transmission, including by way of example, and not limitation, methods detailed in "Synchronizing Communications and Data Between Mobile Devices and Servers," U.S. patent application Ser. No. 12/104,905 to Jeide et al., filed Apr. 17, 2008, which is incorporated herein by reference in its entirety.

However, if the e-mail is an e-mail sent by the backend system 202, then it is caught by interceptor 206 and routed to transformer 210, in accordance with an embodiment of the present invention. The method by which interceptor 206 determines which messages to intercept is discussed further with regard to FIG. 3, below.

Transformer 210 is able to take the e-mail from backend system 202 and prepare a document intended for mobile device 212. In accordance with an embodiment of the present invention, this document is an XML document describing data to be plugged into a graphical user interface ("GUI") on mobile device 212. This GUI allows a user of mobile device 212 to interact with backend system 202 by responding to any requests needed to continue the business process and/or by presenting data which the user must see as part of the business process, in accordance with an embodiment of the present invention.

In accordance with an embodiment of the present invention, transformer 210 is a general transformer module to which plug-ins such as plug-in 212 may be added. Plug-in 212 is specific to the particular "widget e-mail" which has been intercepted, indicating that this e-mail will be transformed into a widget message format for display on mobile device 212. Plug-in 212 gathers information from the widget e-mail and any other sources for creating the widget message. In accordance with an embodiment of the present invention, plug-in 212 is operable to optionally interface with backend system 202 to provide any additional information needed in the widget message. Plug-in 212 then returns the particular widget message to the base transformer 210 module for forwarding to sync engine 208. At this point, sync engine 208 can forward the widget message to mobile device 212.

Mobile device 212 receives the widget message at mobile office client 214, in accordance with an embodiment of the present invention. In an example embodiment, mobile office client 214 is the iAnywhere Mobile Office client platform by Sybase, Inc., although one skilled in the relevant arts will appreciate that the concepts described herein can be applied to other client platform technologies.

Mobile office client 214 has a client widget 216 installed therein which enables the rendering of the GUI showing the widget message, in accordance with an embodiment of the present invention. Following the earlier non-limiting example of the vacation time verification business process, a manager might receive a vacation request at mobile office client 214. This vacation request would contain data to populate a GUI provided by client widget 216. By way of further example, and not limitation, the GUI can display the employee's name, the dates for which vacation approval is requested, and two buttons corresponding to the manager's available actions of "allow" or "decline," to respectively allow or decline the vacation time request.

In accordance with an embodiment of the present invention, client widget 216 comprises an XML file describing the GUI. In accordance with an additional embodiment of the present invention, elements of this GUI are localized, such that the XML file comprises various substitution strings for various GUI elements. The particular localization used is based on a setting. By way of example, and not limitation, this setting could be set on the device 212 itself, the mobile office client 214, or in another location accessible to the GUI.

This widget message is shown in the mobile office client 214 inbox along with other business process widget messages and regular e-mails, in accordance with an embodiment of the present invention. In accordance with a further embodiment of the present invention, the widget message is displayed with a custom icon associated with the corresponding business process, indicating the status of the message (e.g., read or unread, although one skilled in the relevant arts will recognize that other statuses may be used). This icon changes as the status of the message changes, in accordance with an additional embodiment of the present invention.

The mobile office client 214 displays a GUI associated with client widget 216 which enables a set of functionality, in accordance with an embodiment of the present invention. This set of functionality correlates to actions which can be taken by a user of the mobile device 212 within backend system 202. Continuing the above example, a manager may choose to "allow" a vacation time request by clicking on the corresponding button.

By selecting some functionality within the GUI, a response document is sent to responder 218 in mobile office server 205 by the mobile device 212, in accordance with an embodiment of the present invention. In accordance with a further embodiment of the present invention, this response document is formatted as an XML document.

The above process where mobile device 212 receives a widget message offering a set of options for a response details the scenario where mobile device 212 is an intermediary in the business process. However, mobile device 212 may also initiate the process by using a client-invocable widget, in accordance with an embodiment of the present invention. Continuing the above example, if mobile device 212 is associated with an employee requesting vacation time, the employee would need to initiate the vacation request business process. In this case, client widget 216 provides mobile office client 214 with a widget that can be selected to initiate the process. The widget requests information from the user (e.g., date range for the vacation request, manager to be sent to for approval, etc.), and then sends this message in the same manner as the manager sends a response to responder 218 in the previous scenario, in accordance with an embodiment of the present invention. This is discussed more fully below with regard to FIGS. 2 and 3.

Responder 218 receives the message from mobile device 212. In accordance with an embodiment of the present invention, responder 218 is a generic responder module which routes the message to plug-in 220 which has been written specifically to interface with backend system 202. Plug-in 220 then receives the message from responder 218 and calls any needed functions within backend system 202.

III. Delivering Business Process Requests

Figure 3:
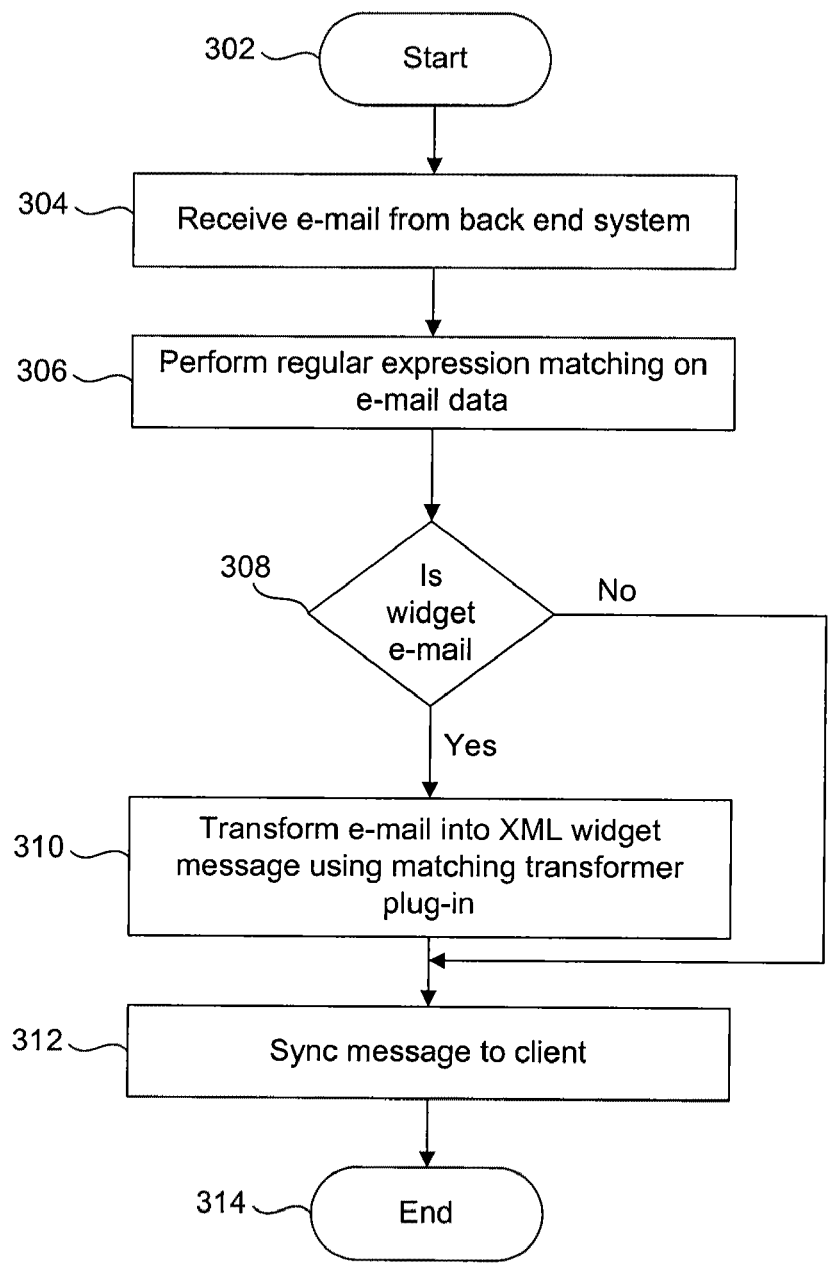
FIG. 3 is a flowchart illustrating steps by which a business process request is delivered from a backend system to a mobile device, in accordance with an embodiment of the present invention.

FIG. 3 is a flowchart 300 illustrating steps by which a business process request is delivered from a backend system to a mobile device, in accordance with an embodiment of the present invention. Continued reference will be made to network 200 of FIG. 2.

Any e-mail intended for delivery to a mobile device can be transformed into a business process request on mobile office server 205, in accordance with an embodiment of the present invention. By accomplishing this, mobile workers can interact directly with the backend system 202 without the need for a dedicated framework. Any backend system 202 can be integrated into network 200 by intercepting e-mails sent by backend system 202 and transforming them into widget messages.

The method begins at step 302 and proceeds to step 304 where an e-mail is received from a backend system, such as backend system 202. At step 306, regular expression matching is performed on the e-mail data in order to determine whether the e-mail is a widget e-mail which should be intercepted, in accordance with an embodiment of the present invention. One skilled in the relevant arts will recognize that methods other than regular expression matching may be employed, and regular expressions are provided by way of example, and not limitation.

In accordance with an embodiment of the present invention, a widget package includes a manifest document which relates various components to the business process associated with the widget package. This manifest document may include references to a particular transformer plug-in 212, responder plug-in 220, and other files and components needed by the business process. This manifest document and the widget package are further detailed in Section VI, below.

In order to determine whether a particular widget package applies to a received e-mail, match rules from the manifest document are used in step 306 to perform the regular expression matching on e-mail data, in accordance with an embodiment of the present invention. By way of example, and not limitation, the match rules may specify a regular expression which must be matched by the e-mail subject line in order for the e-mail to be considered a widget e-mail at step 306. One skilled in the relevant arts will recognize that other fields and regular expression matches may be used.

By continuation of the previous non-limiting example, if an employee has submitted a vacation request to backend system 202, the e-mail generated by backend system 202 to be sent to an approving manager may have a subject line reading "Vacation Approval Request." A regular expression match for any e-mail with the subject line "Vacation Approval Request" could be written in the manifest for the widget package, thereby associating any such e-mail with the components of the widget package.

At step 308, a determination is made as to whether the e-mail is a widget e-mail based on the regular expression matching of step 306. If the e-mail is not a widget e-mail, it is treated as a regular e-mail and synchronized to the mobile device 212 at step 312.

However, if the e-mail is a widget e-mail, then a widget message is created using the transformer plug-in specified within the matched manifest file at step 310, in accordance with an embodiment of the present invention. The widget message is specified in an XML format expected by client widget 216 within mobile device 212, in accordance with a further embodiment of the present invention. A developer seeking to integrate backend system 202 with mobile office server 205 to provide business processes to mobile devices 212 codes the transformer plug-in to create a compatible XML message which can be interpreted by the client widget 216.

This widget message is synchronized to the mobile device 212 using the synchronization engine 208 at step 312, as with regular e-mails, and the method ends at step 314.

IV. Replying to Business Process Requests

After the mobile device 212 has received the widget message, a user may initiate a response to the business process from within client widget 216. Moreover, a client widget 216 may declare a business process to be available on the mobile device 212 for client-initiated invocation, in accordance with an embodiment of the present invention. This interaction within mobile device 212 is described further in Section V, below.

Figure 4:
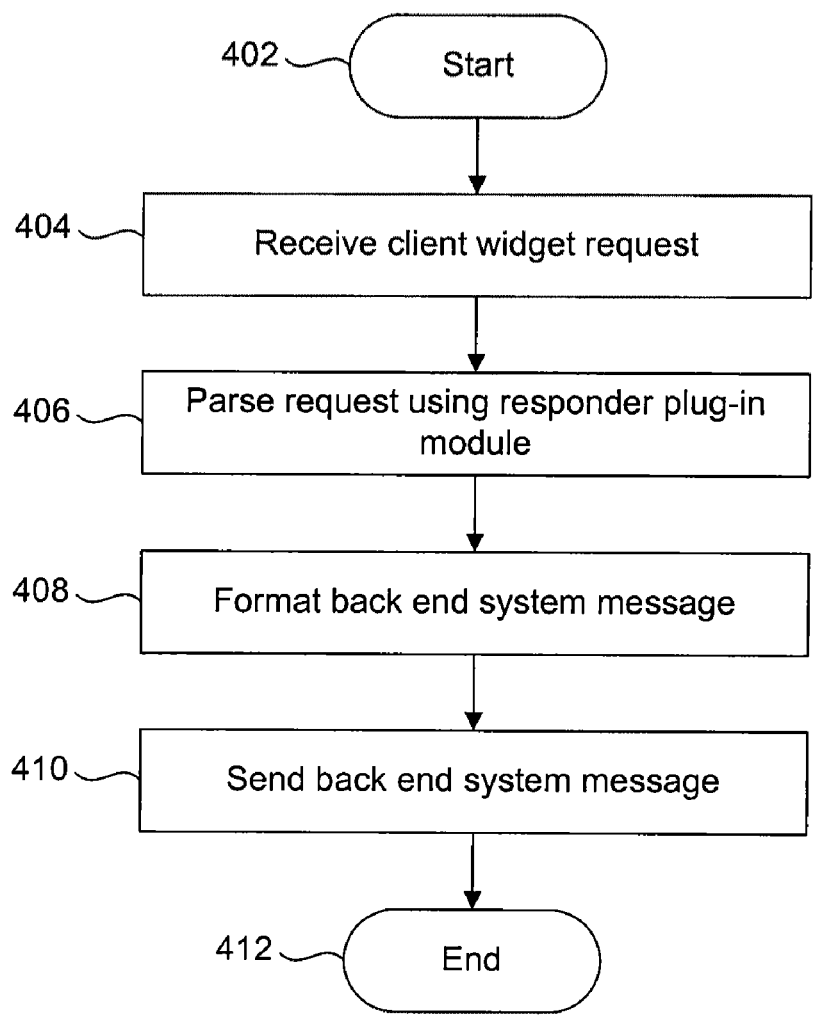
FIG. 4 is a flowchart illustrating steps by which the mobile office server is configured to receive a response message and invoke the appropriate functionality within the backend system, in accordance with an embodiment of the present invention.

Regardless of whether client widget 216 is a response to a business process or the invocation of a new business process, mobile office server 205 is configured to receive these response messages the same way, in accordance with an embodiment of the present invention. FIG. 4 is a flowchart 400 illustrating steps by which the mobile office server 205 is configured to receive a response message and invoke the appropriate functionality within backend system 202, in accordance with an embodiment of the present invention.

The method begins at step 402 and proceeds to step 404 where a client widget request is received. As noted above, this request initiates within client widget 216, either as a response or as a user-invoked business process. At step 406, the responder module 218 forwards the request to an appropriate plug-in 220, as specified in the corresponding manifest file noted in Section III, and further discussed in Section VI. As with the transformer plug-in 212, responder plug-in 220 is developed for compatibility with backend system 202, and understands how to translate client widget requests into functionality within backend system 202.

By way of continuing the previous non-limiting example, the client widget request corresponds to the vacation approval by the manager. A plug-in 220 is developed which receives and interprets the manager's approval request, then formats it at step 408 in a manner which allows plug-in 220 to call the approval function within backend system 202. This message is then sent at step 410.

Further by way of example, the original vacation request by the initiating employee is also a client widget request, and an example of a client-invoked request from a client-invocable client widget 216. Plug-in 220 receives and interprets the employee's vacation request, and likewise formats it at step 408 in a manner which allows plug-in 220 to call the new vacation request function within backend system 202. This message is then sent at step 410. The plug-in 220 to handle these two requests within the same overarching business process may be written as a single plug-in 220, or separated into multiple plug-ins 220, in accordance with an embodiment of the present invention. The method then ends at step 412.

V. Client-Side Display and Invocation of Business Processes

Mobile device 212 comprises the mobile office client 214 which synchronizes with sync engine 208 to receive e-mails and widget messages, in accordance with an embodiment of the present invention. When receiving a widget message, mobile office client 214 relies on an associated client widget 216 to interpret and display, using a GUI, the information contained within the widget message, in accordance with a further embodiment of the present invention.

Figure 5:
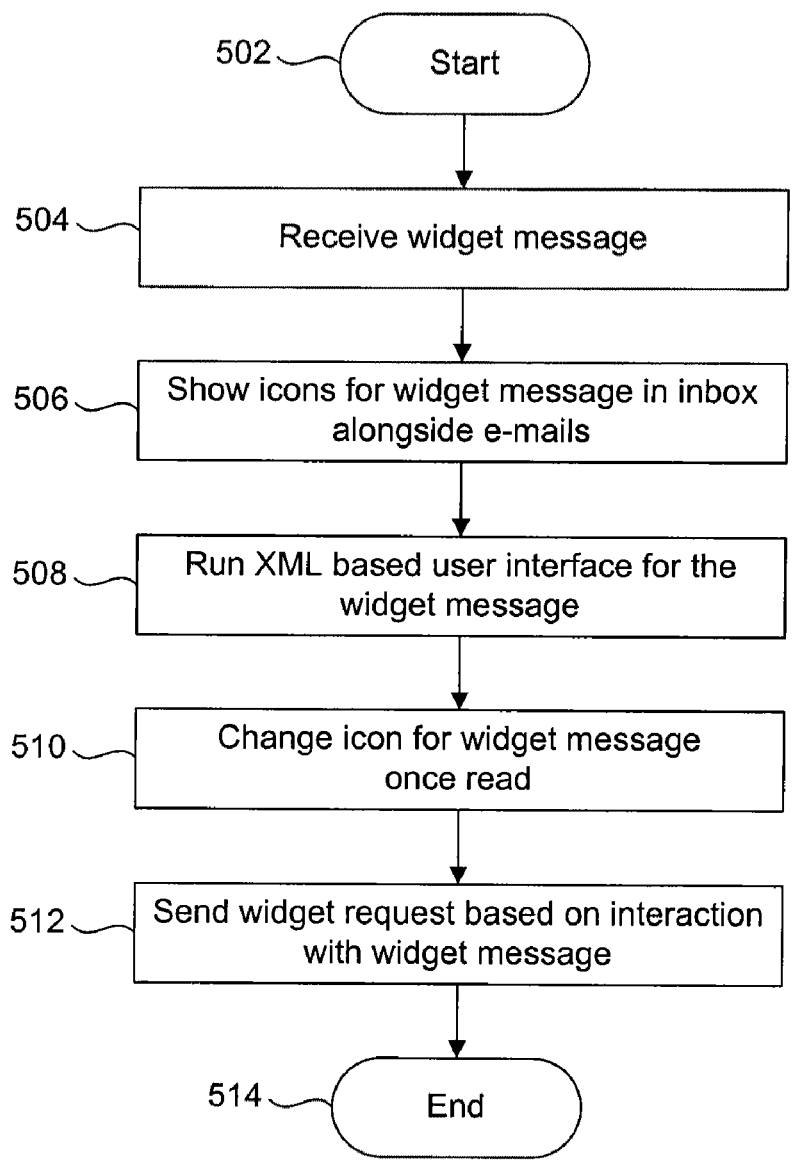
FIG. 5 is a flowchart illustrating steps by which the mobile device is configured to receive a widget message for display, and to provide a response based on interaction with the widget message, in accordance with an embodiment of the present invention.

FIG. 5 is a flowchart 500 illustrating steps by which the mobile device 212 is configured to receive a widget message for display, and to provide a response based on interaction with the widget message, in accordance with an embodiment of the present invention. One skilled in the relevant arts will recognize that not all of these steps apply to every business process, nor must they be performed in the particular order illustrated. However, the order shown corresponds to an embodiment in which mobile device 212 receives a message and provides a response thereto, such as the case with the approving manager in the vacation approval business process described earlier by way of example, and not limitation.

The method begins at step 502 and proceeds to step 504 where a widget message is received. At step 506, the widget message is shown on a message list using icons corresponding to the related business process, in accordance with an embodiment of the present invention. These icons are described within the manifest file, and are discussed further in context in Section VI, below.

The widget message is parsed and used to populate a user interface at step 508 based on a user interface described within client widget 216, in accordance with an embodiment of the present invention. In accordance with a further embodiment of the present invention, the user interface is described using XML. This occurs, by way of example, and not limitation, when a user selects the message from a message list for viewing.

The particular user interface to be used depends on the operating platform of mobile device 212, in accordance with an embodiment of the present invention. As will be described further in Section VI, the manifest file describes several client widgets 216 which can display the information within the widget message received at step 504, with each client widget 216 corresponding to a different operating platform for mobile device 212. By way of example, and not limitation, a client widget 216 is described for the Windows Mobile Professional operating platform, developed by Microsoft Corp.; an additional client widget 216 is described for the Windows Mobile Standard operating platform, developed by Microsoft Corp.; a further client widget 216 is described for the Symbian operating platform, developed by the Symbian Foundation; yet a further client widget 216 is described for the iPhone operating platform, developed by Apple Inc. One skilled in the relevant arts will recognize that additional client widgets 216 can be developed to target any particular mobile operating platform on a mobile device 212, and the aforementioned are provided by way of example, and not limitation.

When the status of the widget message changes, such as when the business process is performed, the icon for the message is changed at step 510 to another icon, in accordance with a further embodiment of the present invention. Upon interaction with the client widget 216, a request may be triggered, resulting in a widget request being sent at step 512. Continuing the previous example, this widget request is sent when an approving manager selects a button to approve a vacation request. The method ends at step 514.

In addition to changing the icon for the message upon performance of a business process action, the widget message itself becomes read-only on mobile device 212, in accordance with an embodiment of the present invention. This prevents triggering of the business process action a subsequent time.

VI. Widget Development and Packaging

A developer wishing to integrate a business process provided by backend system 202 with mobile office server 205 provides a widget package including the various components which are needed by mobile office server 205 and each connected mobile device 212 to interact as part of the business process, in accordance with an embodiment of the present invention. The components included in the widget package enable the functionality detailed in flowcharts 300 of FIG. 3, 400 of FIG. 4, and 500 of FIG. 5, in accordance with a further embodiment of the present invention.

Figure 6:
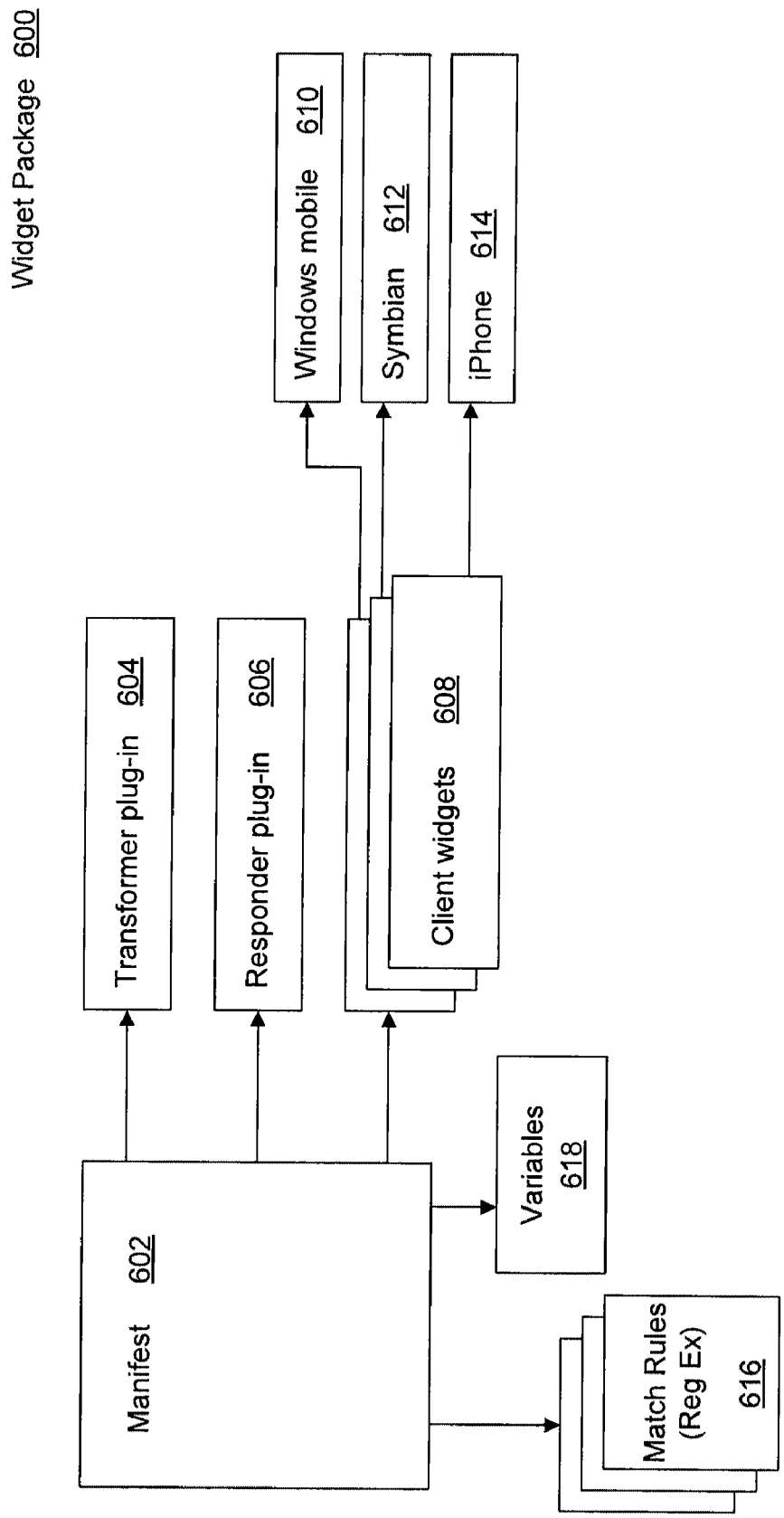
FIG. 6 is an exemplary widget package including the various components to be integrated into the mobile office server and each mobile device, in accordance with an embodiment of the present invention.

FIG. 6 is an exemplary widget package 600 including the various components to be integrated into mobile office server 205 and each mobile device 212, in accordance with an embodiment of the present invention. In accordance with a further embodiment of the present invention, widget package 600 is a zipped or otherwise archived set of files intended for distribution to mobile office server 205 and each mobile device 212.

Widget package 600 comprises a manifest 602, which serves as a packing list of files within the widget package 600.

As is shown in FIG. 6, manifest 602 points to or itself contains the various components which describe how the business process is handled within mobile office server 205 and each mobile device 212, in accordance with an embodiment of the present invention.

In accordance with an embodiment of the present invention, manifest 602 is an XML document. In accordance with a further embodiment of the present invention, manifest 602 comprises XML elements which describe a widget module. By way of example, and not limitation, these elements include ModuleName, ModuleVersion, ModuleDescription, and ModuleDisplayName elements.

As previously stated, a widget message may be presented within mobile office client using a client icon which is associated with the business process. In accordance with an embodiment of the present invention, the manifest 602 comprises an element ClientIconIndex which points to an icon to be used within the inbox of mobile office client 214.

In accordance with a further embodiment of the present invention, manifest 602 also indicates whether the widget module is invocable within mobile office client 214 by the client, without the need for an associated e-mail. Manifest 602 provides an InvokeOnClient element to specify this behavior, in accordance with an embodiment of the present invention.

Manifest 602 also points to a transformer plug-in 604, such as the plug-in 212 of FIG. 2, to be integrated into mobile office server 205, in accordance with an embodiment of the present invention. A TransformPlugin element comprises nested File and Class elements which allow for the specification of a dynamic linked library (DLL) and a .NET type, respectively, that implement the mail processor interface of plug-in 212 and interceptor 206 of FIG. 2, in accordance with an embodiment of the present invention. One skilled in the relevant arts will recognize that the transformer need not be specified using .NET components, and can be in any suitable language.

Similarly, manifest 602 points to a responder plug-in 606, such as plug-in 220 of FIG. 2, to be integrated into mobile office server 205, in accordance with an embodiment of the present invention. A ResponsePlugin element comprises nested File and Class elements which allow for the specification of a dynamic linked library (DLL) and a .NET type, respectively, that implement the device responder interface of plug-in 220 of FIG. 2, in accordance with an embodiment of the present invention. As before, one skilled in the relevant arts will recognize that the responder need not be specified using .NET components, and can be in any suitable language.

Manifest 602 further provides descriptions for the various client widgets 216 to be implemented within mobile office client 214 of mobile device 212, in accordance with an embodiment of the present invention. A ClientWidgets element is provided to describe each of the supported mobile device 212 platforms for the business process widget, as well as the corresponding client module to use for each platform.

A CFWidget element comprises nested File and Class elements which allow for the specification of a dynamic linked library (DLL) and a .NET type, respectively, that implement the client widget 216 of FIG. 2, in accordance with an embodiment of the present invention. As before, one skilled in the relevant arts will recognize that the client widget need not be specified using .NET components, and can be in any suitable language.

The client widget DLL can further implement controls not normally available in the target platform. In accordance with an embodiment of the present invention, the client widget DLL for the Apple iPhone platform includes select box and check box components which are not normally available in the Apple iPhone SDK.

An XMLWidget element describes the client module implemented as an XML user interface description, in accordance with an embodiment of the present invention. This module represents the user interface shown to the user for a business process widget.

Manifest 602 also provides, either in-line or by reference to an external file, a set of match rules to determine whether an e-mail received by mobile office server 205 should be parsed as a widget e-mail, in accordance with an embodiment of the present invention. As previously noted, this is written in the form of regular expressions, although one skilled in the relevant arts will appreciate that other techniques for determining whether an incoming e-mail is a widget e-mail may be used. A match rule is described using a MatchRule element, with inner tags corresponding to various elements of the e-mail. By way of example, and not limitation, a regular expression to match a particular e-mail subject line is embedded within a pair of SubectRegExp tags.

A number of context variables 618 are also provided within manifest 602, in accordance with an embodiment of the present invention. These context variables are made available to the methods in the transformer plug-in 212 and responder plug-in 220.

Additional files and resources can be provided within manifest 602 or linked to by manifest 602. The aforementioned files, resources, and other descriptive elements of widget packet 600 are provided by way of example, and not limitation.

VII. Communications And Example Application

Figure 7:
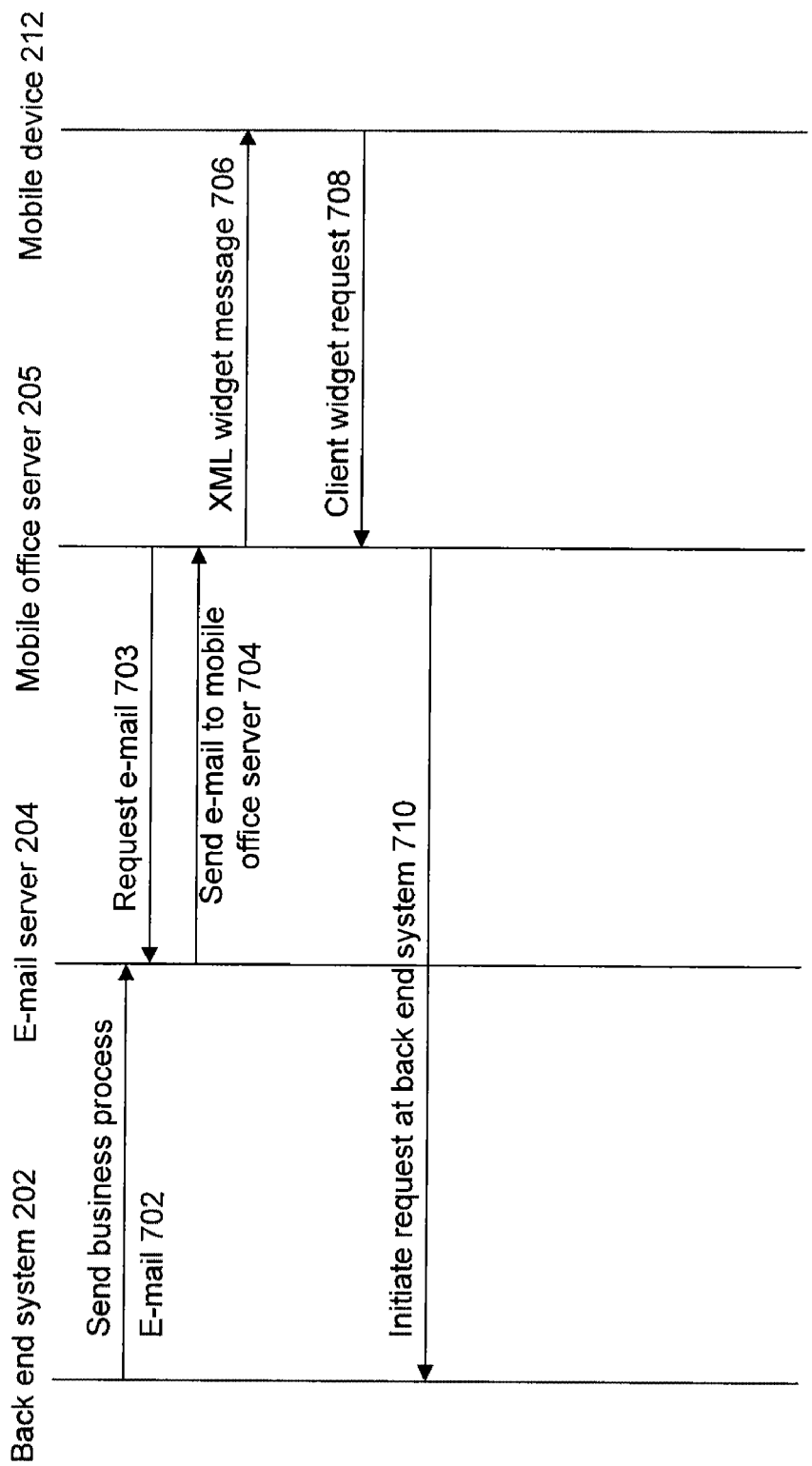
FIG. 7 is a communication flow diagram illustrating communications between the backend system, the e-mail server, the mobile office server, and the mobile device, in accordance with an embodiment of the present invention.

FIG. 7 is a communication flow diagram 700 illustrating communications between backend system 202, e-mail server 204, mobile office server 205, and mobile device 212, in accordance with an embodiment of the present invention.

Continuing with the non-limiting example vacation authorization business process, the backend system sends a business process e-mail at step 702. In the example, this could be an approval request e-mail generated by the backend system upon submission of an employee's vacation request. This e-mail is intended for receipt by the approving manager in the example. As with a normal e-mail, it is received by e-mail server 204. Mobile office server 205 then requests the e-mail at step 703. The e-mail is sent to the mobile office server at step 704 for distribution to the appropriate mobile device 212 associated with the recipient, in accordance with an embodiment of the present invention. One skilled in the relevant arts will appreciate that other means by which mobile office server 205 can retrieve e-mail messages for distribution to mobile devices exist, and the above method is presented by way of example, and not limitation.

Mobile office server 205 receives the e-mail and performs the steps of flowchart 300 of FIG. 3 to generate a widget message, in accordance with an embodiment of the present invention. This widget message is then sent to mobile device 212 at step 706.

The mobile device 212 may then optionally perform the steps of flowchart 500 of FIG. 5 in response to receiving the widget message of step 706, in accordance with an embodiment of the present invention. Based on interaction with the widget message at mobile device 212, the mobile device 212 sends a client widget request at step 708 back to mobile office server 205. Alternatively, a client-invocable client widget 216 may generate client widget request 708 directly upon invocation without the need to receive widget message 706.

Mobile office server 205 receives the client widget request and performs the steps of flowchart 400 of FIG. 4 to interact with backend system 202, in accordance with an embodiment of the present invention. The resulting backend system message is sent to the backend system 202 at step 710.

VIII. Example Computer System Implementation

Figure 8:
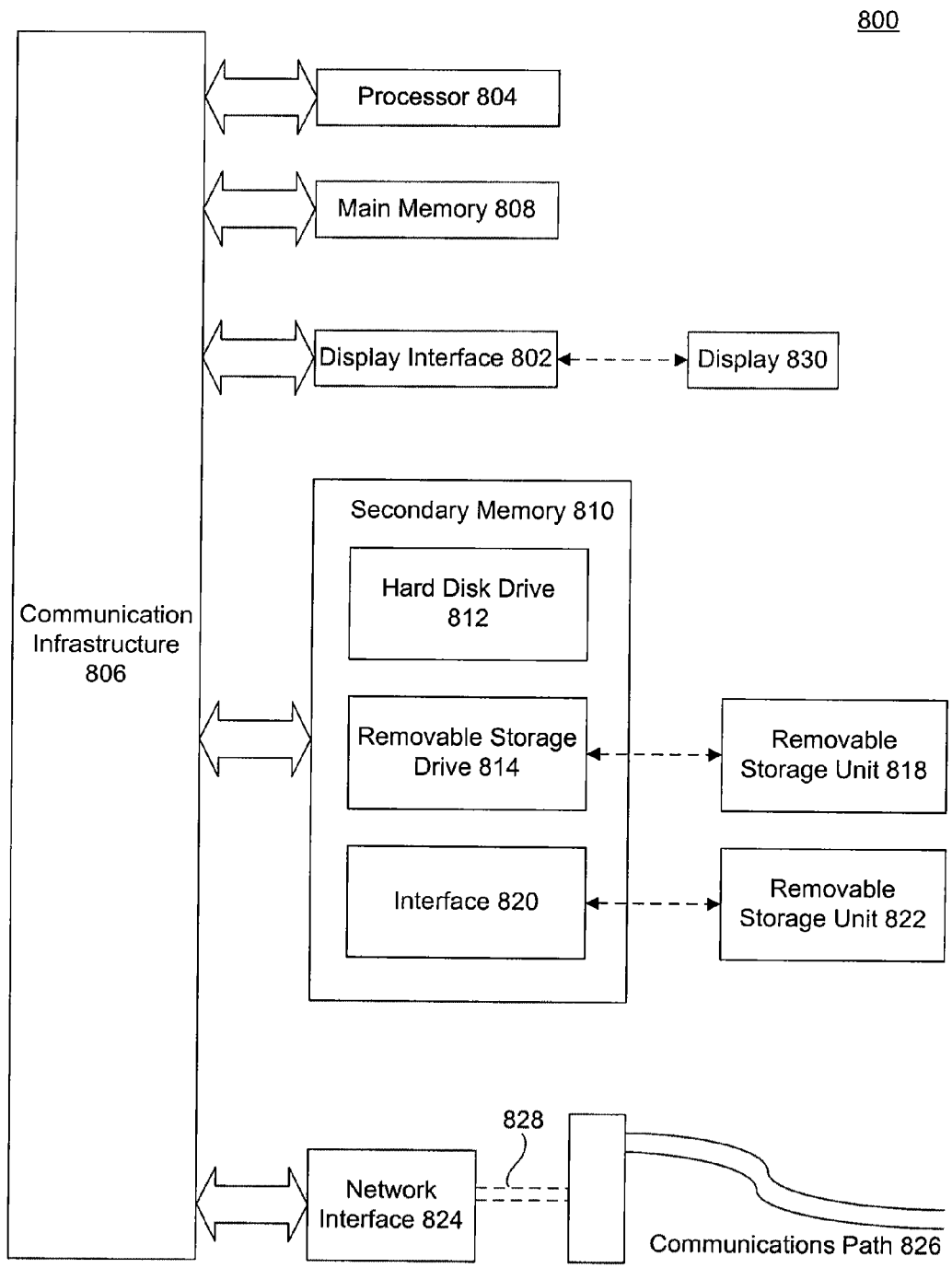
FIG. 8 depicts an example computer system in which embodiments of the present invention may be implemented.

Various aspects of the present invention can be implemented by software, firmware, hardware, or a combination thereof. FIG. 8 illustrates an example computer system 800 in which the present invention, or portions thereof, can be implemented as computer-readable code. For example, the methods illustrated by flowcharts 300 of FIG. 3, 400 of FIG. 4, and 500 of FIG. 5, can be implemented in system 800. Various embodiments of the invention are described in terms of this example computer system 800. After reading this description, it will become apparent to a person skilled in the relevant art how to implement the invention using other computer systems and/or computer architectures.

Computer system 800 includes one or more processors, such as processor 804. Processor 804 can be a special purpose or a general purpose processor. Processor 804 is connected to a communication infrastructure 806 (for example, a bus or network).

Computer system 800 also includes a main memory 808, preferably random access memory (RAM), and may also include a secondary memory 810. Secondary memory 810 may include, for example, a hard disk drive 812, a removable storage drive 814, and/or a memory stick. Removable storage drive 814 may comprise a floppy disk drive, a magnetic tape drive, an optical disk drive, a flash memory, or the like. The removable storage drive 814 reads from and/or writes to a removable storage unit 818 in a well known manner. Removable storage unit 818 may comprise a floppy disk, magnetic tape, optical disk, etc. which is read by and written to by removable storage drive 814. As will be appreciated by persons skilled in the relevant art(s), removable storage unit 818 includes a computer usable storage medium having stored therein computer software and/or data.

In alternative implementations, secondary memory 810 may include other similar means for allowing computer programs or other instructions to be loaded into computer system 800. Such means may include, for example, a removable storage unit 822 and an interface 820. Examples of such means may include a program cartridge and cartridge interface (such as that found in video game devices), a removable memory chip (such as an EPROM, or PROM) and associated socket, and other removable storage units 822 and interfaces 820 which allow software and data to be transferred from the removable storage unit 822 to computer system 800.

Computer system 800 may also include a communications interface 824. Communications interface 824 allows software and data to be transferred between computer system 800 and external devices. Communications interface 824 may include a modem, a network interface (such as an Ethernet card), a communications port, a PCMCIA slot and card, or the like. Software and data transferred via communications interface 824 are in the form of signals which may be electronic, electromagnetic, optical, or other signals capable of being received by communications interface 824. These signals are provided to communications interface 824 via a communications path 826. Communications path 826 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 818, removable storage unit 822, and a hard disk installed in hard disk drive 812. Signals carried over communications path 826 can also embody the logic described herein. Computer program medium and computer usable medium can also refer to memories, such as main memory 808 and secondary memory 810, which can be memory semiconductors (e.g. DRAMs, etc.). These computer program products are means for providing software to computer system 800.

Computer programs (also called computer control logic) are stored in main memory 808 and/or secondary memory 810. Computer programs may also be received via communications interface 824. Such computer programs, when executed, enable computer system 800 to implement the present invention as discussed herein. In particular, the computer programs, when executed, enable processor 804 to implement the processes of the present invention, such as the steps in the methods illustrated by flowcharts 300 of FIG. 3, 400 of FIG. 4, and 500 of FIG. 5, discussed above. Accordingly, such computer programs represent controllers of the computer system 800. Where the invention is implemented using software, the software may be stored in a computer program product and loaded into computer system 800 using removable storage drive 814, interface 820, hard drive 812 or communications interface 824.

The invention is also directed to computer program products comprising software stored on any computer useable medium. Such software, when executed in one or more data processing device, causes a data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

IX. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. It should be understood that the invention is not limited to these examples. The invention is applicable to any elements operating as described herein. Accordingly, the breadth and scope of the present invention should not be limited by any of the above-described exemplary embodiments, but should be defined only in accordance with the following claims and their equivalents.

What is claimed is:

1. A method comprising:
   intercepting an e-mail from a backend system;
   determining that the e-mail is a widget e-mail;
   transforming the widget e-mail into a widget message, the widget message comprising generated syntax configured to display one or more widgets corresponding to a business process of the widget e-mail; and
   synchronizing the widget message to a client device.

2. The method of claim 1, wherein determining that the e-mail is a widget e-mail comprises:
   performing regular expression matching on a field of the e-mail.

3. The method of claim 2, wherein the regular expression matching is specified within a manifest file.

4. A computer-readable storage device having computer-executable instructions stored thereon, execution of which, by a computing device, causes the computing device to perform operations comprising:
   intercepting an e-mail from a backend system;
   determining that the e-mail is a widget e-mail;
   transforming the widget e-mail into a widget message, the widget message comprising generated syntax configured to display one or more widgets corresponding to a business process of the widget e-mail; and
   synchronizing the widget message to a client device.

5. The computer-readable storage device of claim 4, wherein determining that the e-mail is a widget e-mail comprises:
   performing regular expression matching on a field of the e-mail.

6. The computer-readable storage device of claim 5, wherein the regular expression matching is specified within a manifest file.

7. A system, comprising:
   an interceptor configured to intercept an e-mail from a backend system and determine that the e-mail is a widget e-mail;
   a transformer configured to transform the widget e-mail into a widget message, the widget message comprising generated syntax configured to display one or more widgets corresponding to a business process of the widget e-mail; and
   a sync engine configured to send the widget message to a mobile device.

8. The system of claim 7, wherein the transformer comprises a transformer plug-in.

9. The system of claim 7, wherein the transformer is further configured to populate the widget message with information from the widget e-mail.

10. The system of claim 7, the transformer comprising:
    an interface to the backend system,
    wherein the transformer is further configured to populate the widget message with information from the backend system.

11. The system of claim 7, further comprising:
    a responder configured to receive a client widget request; and
    call a function within the backend system responsive to the client widget request.

12. The system of claim 7, wherein the interceptor consults regular expression match rules within a manifest to determine whether the e-mail is a widget e-mail.

13. The system of claim 7, wherein the interceptor and the transformer are specified by a manifest corresponding to the widget e-mail.

14. A method comprising:
    receiving a client widget request from a client device, the client widget request provided as a function of a widget message comprising generated syntax configured to display one or more widgets corresponding to a business process of a widget e-mail;
    creating a function call to a backend system responsive to the client widget request; and
    transmitting the function call to the backend system.

15. The method of claim 14, wherein the client widget request is invoked at the client device.

16. A system comprising:
    a mobile office client in communication with a mobile office server; and a client widget configured to receive a widget message, run a user interface, and populate the user interface with contents of the widget message, the widget message comprising generated syntax configured to display one or more widgets corresponding to a business process of a widget e-mail.

17. The system of claim 16, wherein the client widget is further configured to display content of the widget message within an inbox, and to show an icon corresponding to a business process for the widget message.

18. The system of claim 17, wherein the client widget is further configured to modify the icon responsive to a change of state in the widget message.

* * * * *